United States Patent [19]

Itoh et al.

[11] Patent Number: 5,796,175
[45] Date of Patent: Aug. 18, 1998

[54] POWER SUPPLY CONTROL DEVICE FOR ELECTRIC VEHICLE

[75] Inventors: Hisahiro Itoh; Tomoyuki Itoh; Koji Furumoto; Shinji Yoshikawa, all of Saitama-ken, Japan

[73] Assignee: Honda Giken Kogyo Kabushiki Kaisha, Tokyo, Japan

[21] Appl. No.: 689,148

[22] Filed: Jul. 30, 1996

[30] Foreign Application Priority Data

Aug. 3, 1995 [JP] Japan ................. 7-216560

[51] Int. Cl.$^6$ ................................ H02H 1/00
[52] U.S. Cl. ........................ 307/10.1; 307/64
[58] Field of Search .................... 307/9.1, 10.1, 307/10.7, 43–46, 48, 64–66; 180/65.1, 65.8; 290/50; 320/48; 322/62–64

[56] References Cited

U.S. PATENT DOCUMENTS

5,510,658  4/1996  Nakayama ................. 307/10.1
5,569,966  10/1996  Schantz et al. ............. 307/10.1

*Primary Examiner*—Richard T. Elms
*Attorney, Agent, or Firm*—Armstrong, Westerman, Hattori, McLeland & Naughton

[57] ABSTRACT

A backup power supply 11 is not loaded by peripheral equipment 9 and a low-voltage battery 5. A switch controller 12 is energized by any of the backup power supply 11, the DC/DC converter 7, and the low-voltage battery 5 for controlling the energization of a relay 3L. When the power supply from the DC/DC converter 7 and the low-voltage battery 5 to the switch controller 12 is declined, it is complemented by the backup power of a low voltage from the backup power supply 11. Accordingly, the switch controller 12 is always energized with a sufficient level of the power supply regardless of the residual storage of the low-voltage battery 5.

9 Claims, 7 Drawing Sheets

POWER SUPPLY CONTROL DEVICE FOR ELECTRIC VEHICLE

BACKGROUND OF THE INVENTION

1. Field of the Invention

The present invention relates to a power supply control device for an electric vehicle and particularly, to an improved power supply control device for an electric vehicle capable of properly activating an electric equipment powered from a battery even if a large amount of electric power is required from the battery of which residual power storage is insufficient.

2. Description of the Related Art

A conventional electric vehicle is provided with a powerful drive motor of which rated voltage (e.g. 288 volts) is different from a rated voltage (e.g. 12 volts) of other electric components (peripheral equipments), including head lights and an air conditioner for vehicle operation, and an engine control unit (ECU) and a motor controller for control operation, and hence carries a main battery (referred to as a high-voltage battery hereinafter) for supply of a high voltage (288 V) to the drive motor and a sub battery (referred to as a low-voltage battery hereinafter) for supply of a low voltage (12 V) to the peripheral equipments. The low-voltage battery is charged with a low voltage converted down by a DC/DC converter from the output of the high-voltage battery.

Figure 6:
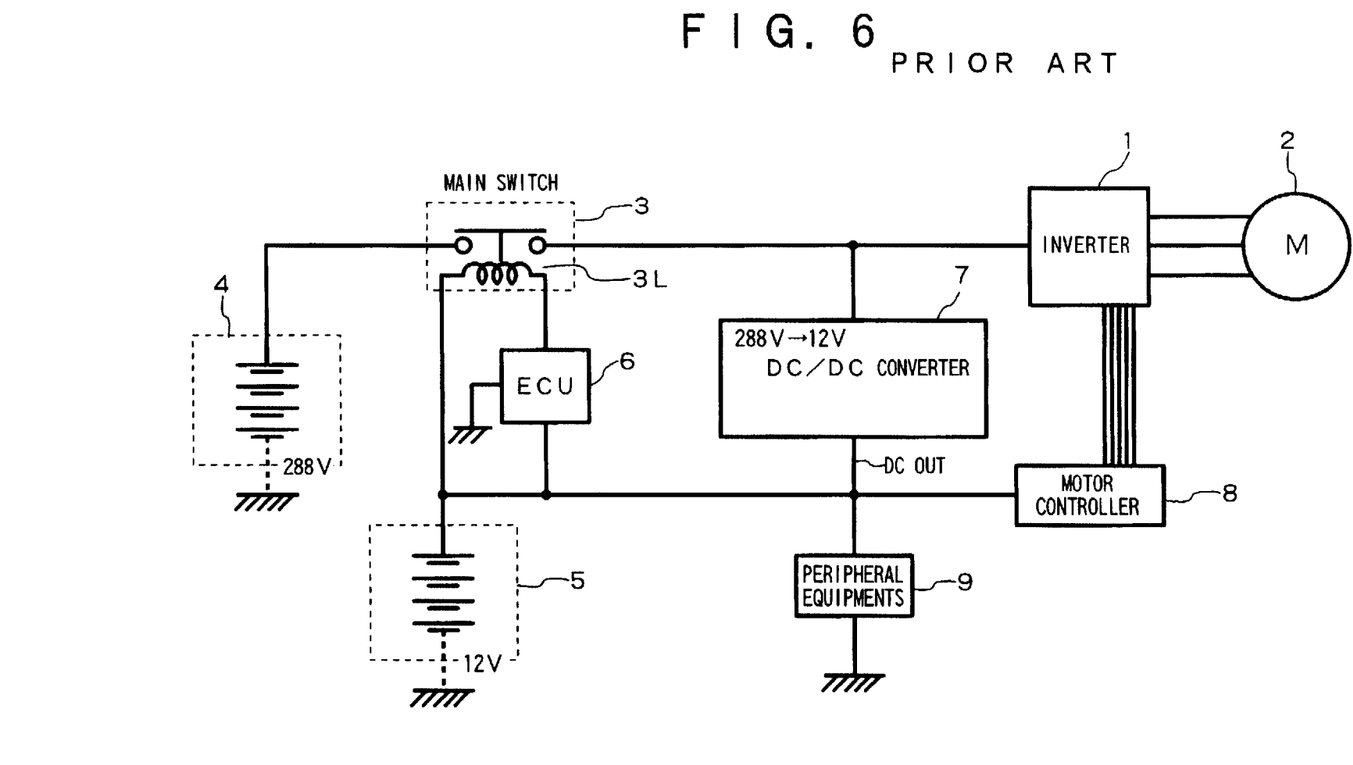
FIG. 6 is a block diagram of a conventional power supply circuit for an electric vehicle.

FIG. 6 is a block diagram of a power supply circuit of the conventional electric vehicle, in which a high-voltage battery 4 is connected at its output port through a main switch 3 to an inverter 1 and a DC/DC converter 7. The output port of the DC/DC converter 7 is connected to a low-voltage battery 5, a motor controller 8, peripheral equipment or components 9, an ECU 6, and a relay 3L.

Figure 7:
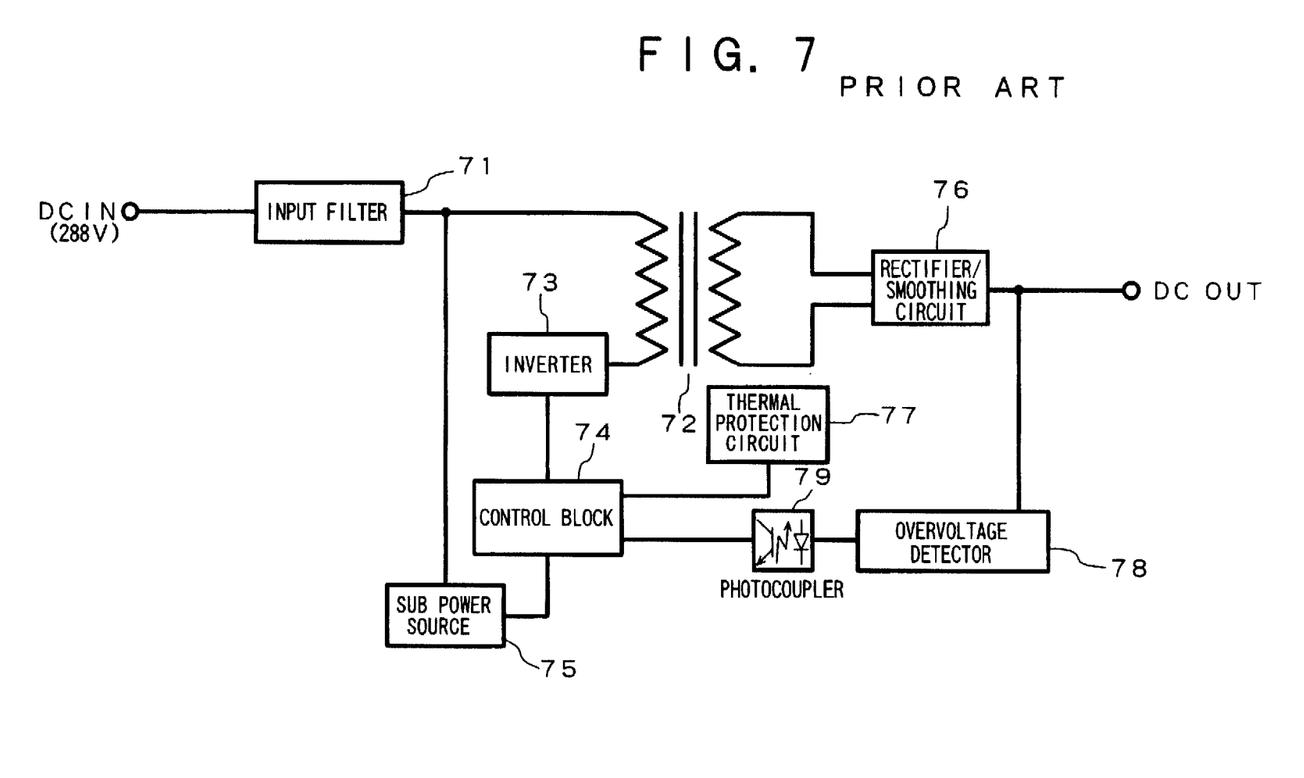
FIG. 7 is a block diagram of a DC/DC converter 7 illustrated in FIG. 6.

FIG. 7 is a block diagram showing an arrangement of the DC/DC converter 7 which comprises an input filter 71, a transformer 72, an inverter 73 connected to a primary port of the transformer 72, a control block 74 for controlling the inverter 73, a sub power source 75 for energizing the control block 74, a rectifier/smoothing circuit 76 connected to a secondary port of the transformer 72, a thermal protection circuit 77, an overvoltage detector 78 for detecting an overvoltage of the output, and a photocoupler 79 for supplying in an insulated state an overvoltage signal to the control block 74. The sub power source 75 may be a DC/DC converter for converting a high voltage (288 V) supplied through the input filter 71 from the high-voltage battery 4 to a rated voltage (12 V) for the control block 74.

When the ECU 6 is energized, it drives the relay 3L to hold the main switch 3 shown in FIG.6 in its closed state. If any trouble disables the ECU 6, the main switch 3 is opened to interrupt the supply of a high voltage to the subsequent circuit. The motor 2 is energized by the inverter 1 responsive to phase control of the motor controller 8 for rotation at a given speed and a corresponding torque.

As the ECU 6 actuates the relay 3L, the main switch 3 is closed to connect the high-voltage battery 4 to the inverter 1 and the DC/DC converter 7. The DC/DC converter 7 then converts the high voltage (DC 288V) of the high-voltage battery 4 to a 12 V DC output.

In the above arrangement, as long as the low-voltage battery 5 holds a sufficient residual power storage, the power supply to the ECU 6, the relay 3L, and the motor controller 8 can be guaranteed by the low-voltage battery 5 as well as the DC/DC converter 7 even if the peripheral equipments 9 consume a large power. If the low-voltage battery 5 is declined to an insufficient level in residual power storage due to some reason, e.g. not turning off the head lights, it fails to continue a sufficient power supply and the DC/DC converter 7 feeds most of its output for charging the low-voltage battery 5. Simultaneously, the DC/DC converter 7 starts its self-protecting function and decreases its output to a predetermined level when the output is over the maximum rating. Accordingly, the ECU 6 and the motor controller 8 are not supplied with a sufficient power and may produce unstable operations which may result in the following adversities.

(1) When the motor vehicle is regeneratively braked during a high speed running, a counter-electromotive force which the motor 2 generates due to the regenerative breaking, can be regulated by the voltage control action of the inverter 1, if the motor controller 8 is in normal operation. If the motor controller 8 fails to carry out the normal operation, however, the voltage regulation is not performed thus allowing release of a higher counter-electromotive force. As countermeasure thereto, the dielectric strength of the inverter 1 and the DC/DC converter 7 has to be increased hence causing increase in the overall size and weight of the control arrangement.

(2) Such higher counter-electromotive force may be controlled by the action of the high-voltage battery 4 as a regulator when the main switch 3 is kept close and, therefore, the dielectric strength is not always needed to be increased. However, an insufficient power supply to the ECU 6 causes the main switch 3 to be hardly held in the closed state, and thus the high-voltage battery 4 is disconnected and fails to act as the regulator.

Therefore, the dielectric strength of each component has to be increased in this case.

(3) When the low-voltage battery 5 has been charged and supplies a power to the ECU 6 enough to actuate the re-closing of the main switch 3, the potential between the input and output contacts of the main switch 3 may become so high that a large current may flow across the contacts. Accordingly, the main switch 3 should be protected with a much greater margin for guaranteed and safe switching action.

In the prior art, shortage of residual power in the low-voltage battery 5 may allow the counter-electromotive force generated by regenerative braking to appear and not to be regulated by the high-voltage battery 4.

SUMMARY OF THE INVENTION

An object of the present invention is to provide a power supply control device for an electric vehicle capable of eliminating troubles caused by the consumption of large amounts of power while a low-voltage battery stores an insufficient level of residual power.

Such troubles are eliminated by at least one of following:

(1) attenuating a counter-electromotive force generated by regenerative braking to ensure a normal action of an inverter 1 regardless of shortage of the residual storage in the low-voltage battery 5, or (2) allowing a high-voltage battery 4 to act as a regulator while a main switch remains closed regardless of the shortage of the residual storage of the low-voltage battery 5.

Since, the control function (2) of closing the main switch 3 is lower in the consumption of power than the control function (1) of actuating the normal action of the inverter 1, the present invention is directed towards the control function (2).

A power supply control device for an electric vehicle according to the present invention having a voltage converter means and a drive motor both connected through a main switch to a high-voltage battery, a low-voltage battery and a vehicle periphery equipments both connected to the voltage converter means for receiving a power supply, and a means connected to at least one of the voltage converter means and the low-voltage battery for receiving a power supply and for controlling the opening and closing actions of the main switch, is further provided with a means for supplying a backup power to the switch controlling means so that the power supply to the switch controlling means is not lower than a predetermined level.

If the switch controlling means is not sufficiently energized because the low-voltage battery stores only an insufficient level of residual charge or the voltage converter means is dedicated to a large power consumption of other loads, it can be sufficiently activated with the backup power.

Accordingly, the main switch is securely maintained in its close state as prevented from performing an unwanted opening action. This allows the high-voltage battery 4 to serve as a regulator for regulating any counter-electromotive force generated by regenerative braking with no action of the motor controller 8. As the main switch remains closed in normal mode, there is produced no irregularly high potential difference between both contacts of the main switch thus eliminating the need of an unnecessary high dielectric strength.

DETAILED DESCRIPTION OF THE PREFERRED EMBODIMENTS

Figure 1:
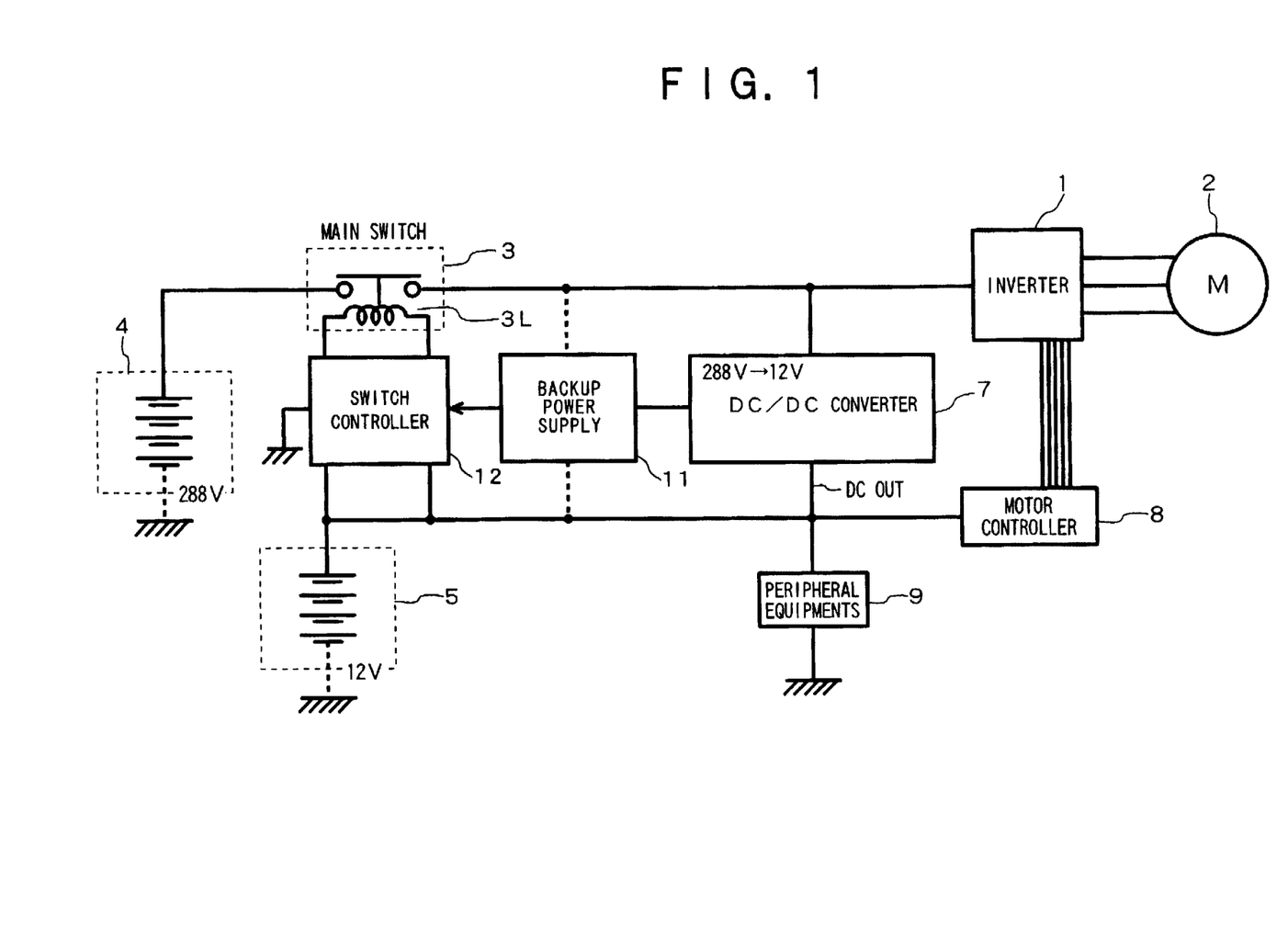
FIG. 1 is a functional block diagram according to the present invention.

The preferred embodiments of the present invention will be described in more details referring to the accompanying drawings. FIG. 1 is a functional block diagram according to the present invention, in which like components are denoted by like numerals as of the prescribed prior art.

A backup power supply 11 is a power source not loaded by the peripheral equipments 9 and a low-voltage battery 5 and may be a DC/DC converter, a supercapacitor having a mass of storage capacitance, or a secondary battery cell. A switch controller 12 is corresponding to the ECU 6 and the power supply line, which are described previously with FIG. 6, and is supplied with power by the backup power supply 11, the low-voltage battery 5, and the DC/DC converter 7 for energizing a relay 3L.

When the power supply from the DC/DC converter 7 and the low-voltage battery 5 to the switch controller 12 is declined, it is complemented by a low voltage supply from the backup power supply 11 so that the switch controller 12 is constantly supplied with a sufficient level of the power supply regardless of the residual storage of the low-voltage battery 5.

The present invention allows the main switch 3 to be maintained in the close state even if the power supply from the low-voltage battery 5 and the DC/DC converter 7 is insufficient. Accordingly, a counter-electromotive force generated by regenerative braking can be regulated by functioning the high-voltage battery 4 as a regulator thus eliminating the need of an undesirably higher dielectric strength.

Figure 2:
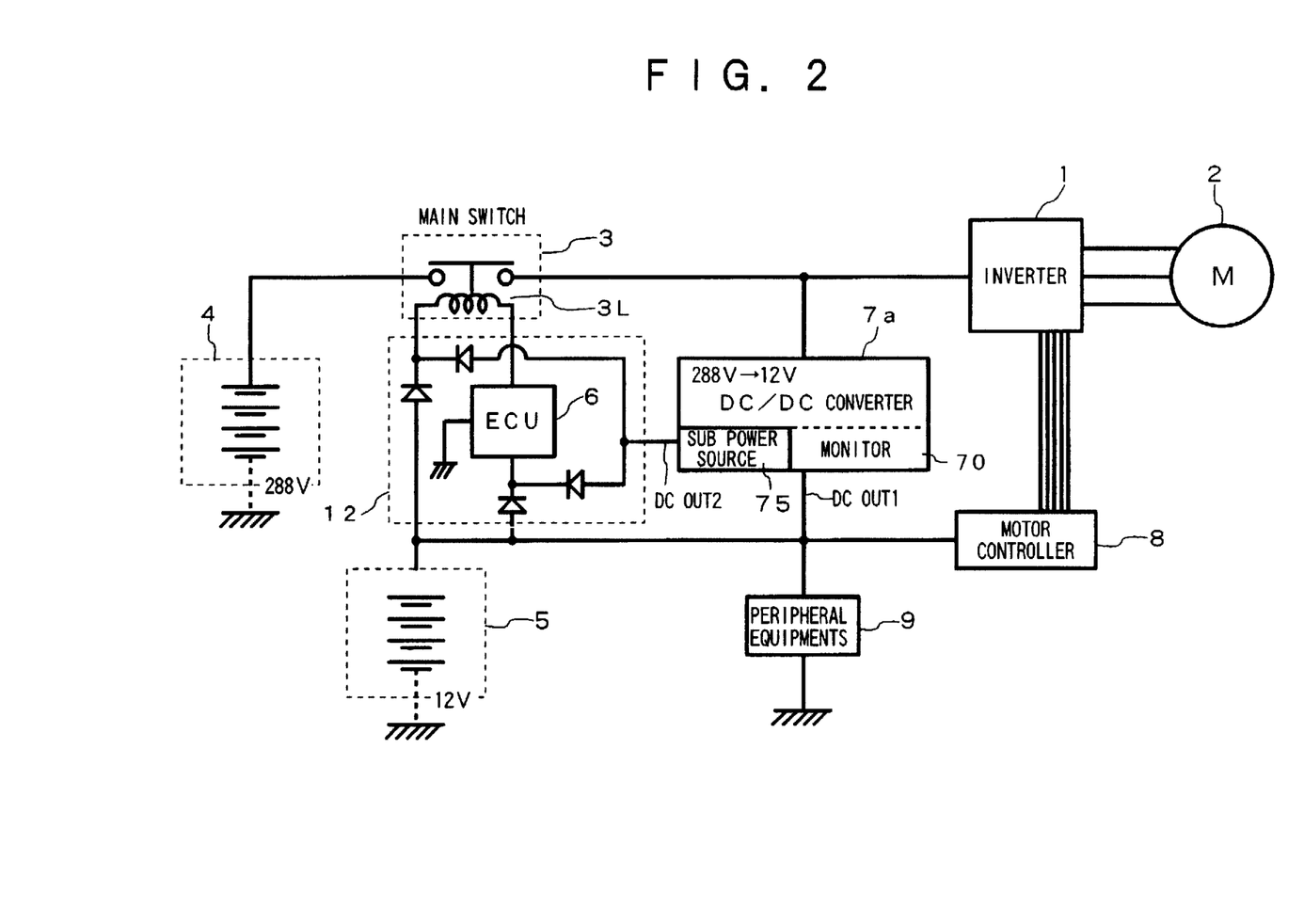
FIG. 2 is a block diagram of a power supply circuit for an electric vehicle showing a first embodiment of the present invention.
Figure 3:
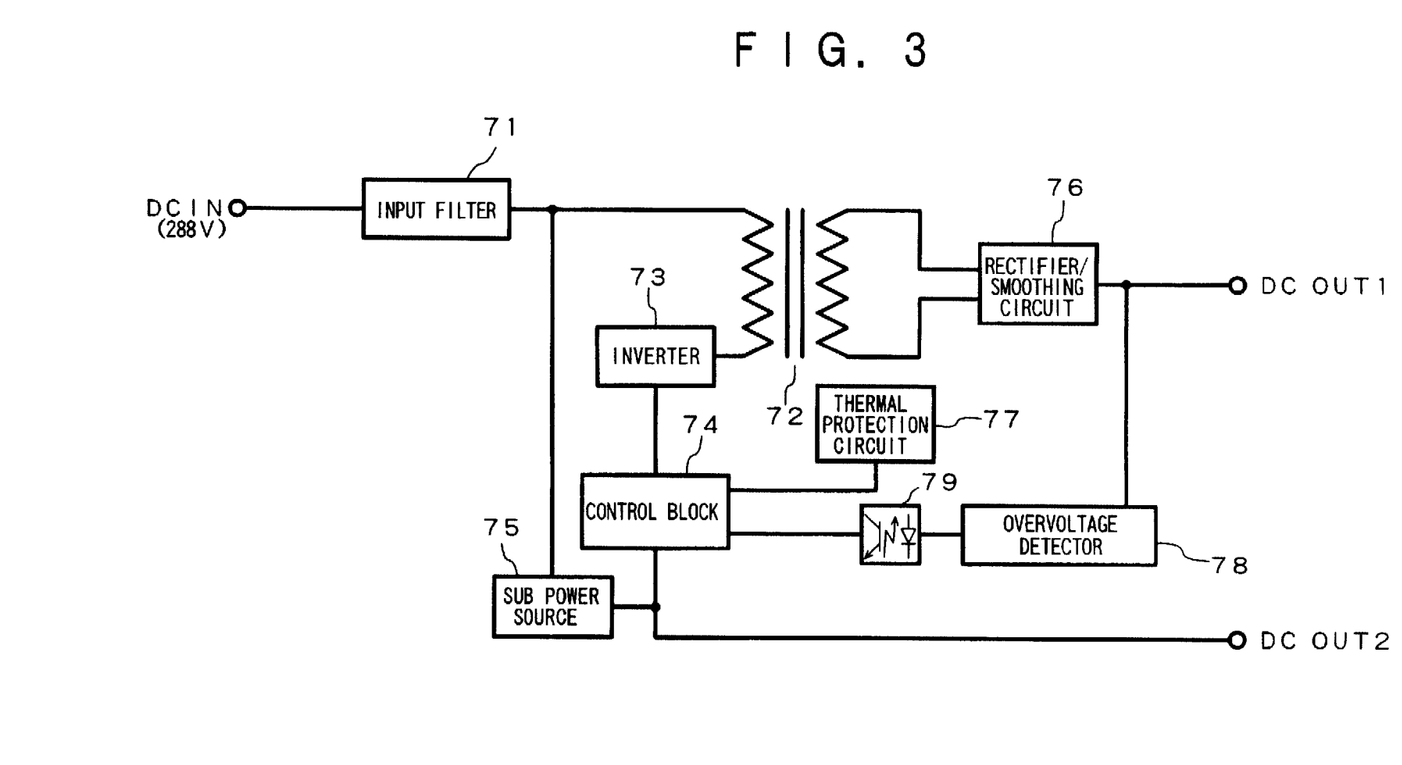
FIG. 3 is a block diagram of a DC/DC converter illustrated in FIG. 1.

FIG. 2 is a block diagram of a power supply circuit for an electric vehicle showing a first embodiment of the present invention, and FIG. 3 is a block diagram of a DC/DC converter 7a in the power supply circuit, in which like components are denoted by like numerals as of the previous arrangement.

In this embodiment, the DC/DC converter 7a includes a sub power source 75 which is provided therein for energizing the inner circuit of the DC/DC converter 7a with a low voltage (12 V) and used as the backup power supply 11. More specifically, a part of the output (DC OUT2) of the sub power source 75 is supplied as a backup power to the ECU 6 and the relay 3L of the main switch 3. The sub power source 75 is loaded by only the inner circuit of the DC/DC converter 7a including a control block 74, and the ECU 6 and the relay 3L of the main switch 3 which both consume substantially constant, small amounts of power, but not by the peripheral equipments 9 and the low-voltage battery 5 both of which largely vary in the power consumption therein. Accordingly, the sub power source 75 can stably generate a low voltage (e.g. 12 V) regardless of the output of the DC/DC converter 7 or even when the DC/DC converter 7a is heavily loaded.

According to the first embodiment, the ECU 6 and the relay 3L for controlling the switching action of the main switch 3 are complemented for sufficient power by the sub power source 75 regardless of the residual storage of the low-voltage battery 5. The main switch 3 is thus maintained in its close state even if the power supply from the low-voltage battery 5 and the DC/DC converter 7a is insufficient. This permits the high-voltage battery 4 to serve as a regulator for any counter-electromotive force generated by regenerative braking, hence eliminating the need of an unnecessarily higher dielectric strength for the DC/DC converter 7a and the main switch 3.

The sub power source 75 of the first embodiment serves as a power source to the ECU 6 and the relay 3L as well as the inner circuit of the DC/DC converter 7a. More particularly, the ECU 6 and the relay 3L are mainly power-supplied by the low-voltage battery 5 and the DC/DC converter 7a while the sub power source 75 serves only as a backup power source to complement a shortage of the main supply. The sub power source 75 is hence free from a rush current introduced when the main power is switched on and is required for no abundant power supply capability. The existing sub power source 75 installed in the conventional DC/DC converter 7, therefore, can successfully be used without any modification.

In this embodiment, the energizing of the relay 3L by the sub power source 75 is controlled by the ECU 6 as well as the energizing of the relay 3L by the low-voltage battery 5. Upon the main switch 3 normally receiving an open command from the ECU 6, its contacts are dedicatedly opened even if the sub power source 75 is connected for backup supply. This will provide a safety condition for maintenance service.

The sub power source 75, like the main circuit of the DC/DC converter 7a has a self-protection function for attenuating the output current if it exceeds a rated level. It is then preferable to have a monitor 70 for monitoring the output of the sub power source 75 and if the output power exceeds a predetermined level, producing an alarm sound.

Figure 4:
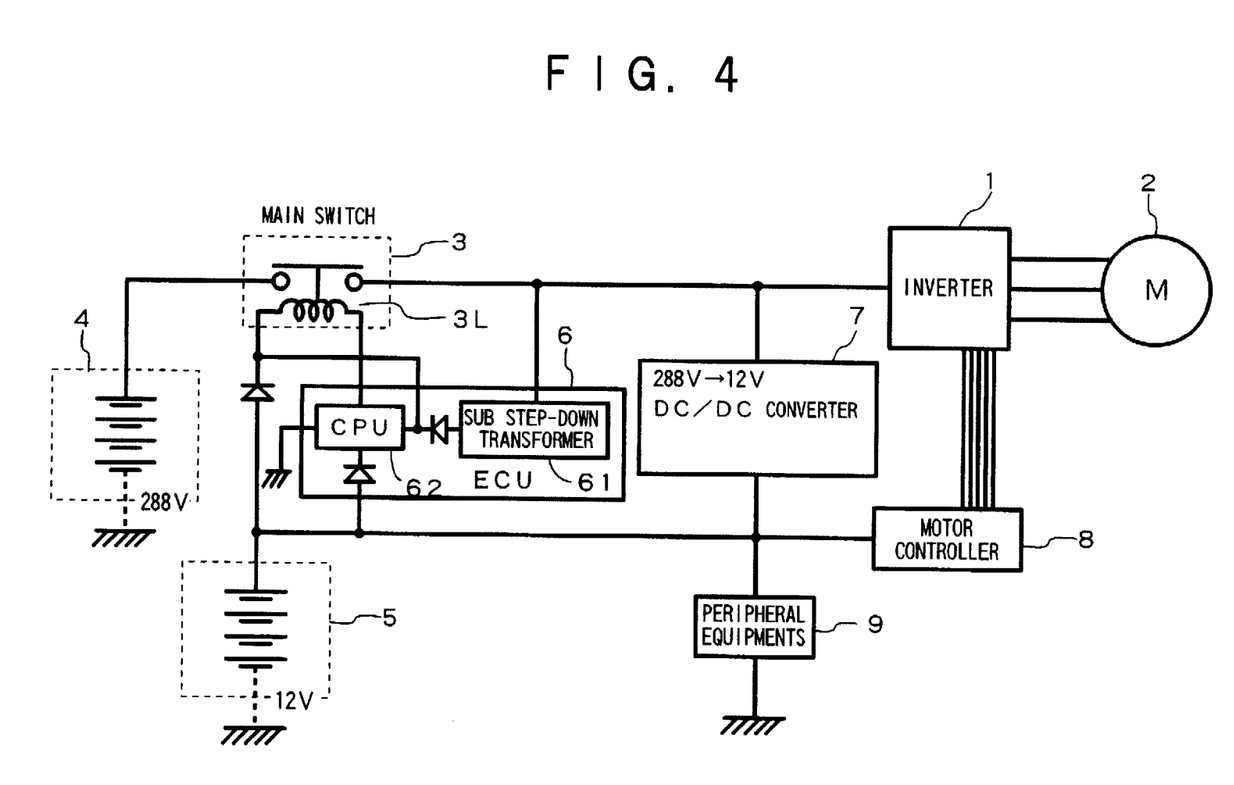
FIG. 4 is a block diagram of a power supply circuit for an electric vehicle showing a second embodiment of the present invention.

FIG. 4 is a block diagram of a power supply circuit for an electric vehicle showing a second embodiment of the present invention, in which like components are denoted by like numerals as of the previous embodiment.

The second embodiment includes a sub step-down transformer 61 (or DC/DC converter) provided in the ECU 6 for converting the output of the high-voltage battery 4 into a low voltage which is then supplied as the backup power to a CPU 62 of the ECU 6 and to the relay 3L of the main switch 3.

As the sub step-down transformer 61 is loaded by only the CPU 62 and the main switch 3, it can stably supply a low voltage (e.g 12 V) regardless of the output of the DC/DC converter 7. More particularly, the ECU 6 and the relay 3L in the second embodiment for controlling the switching action of the main switch 3 are complemented for the sufficient power by the sub step-down transformer 61 regardless of the residual storage of the low-voltage battery 5. The main switch 3 is hence maintained in its close state even if the power supply from the low-voltage battery 5 and the DC/DC converter 7 is insufficient. This allows the high-voltage battery 4 to act as a regulator to regulate any counter-electromotive force generated by regenerative braking of the vehicle thus eliminating the need of an unnecessary high dielectric strength for the DC/DC converter 7 and the main switch 3.

Similarly, the sub step-down transformer 61 of the second embodiment serves as only a backup power source for the ECU 6 and the relay 3L and is free from a rush current introduced when the main power supply is put on. The sub step-down transformer 61 is, therefore, required for no abundant capability of power supply, contributing to the minimum dimensions and cost of the power supply. Upon the main switch 3 receiving normally an open command from the CPU 62 of the ECU 6, its contacts are dedicatedly opened even when the sub step-down transformer 61 serves as a backup supply. This will provide a safety condition for maintenance service.

Figure 5:
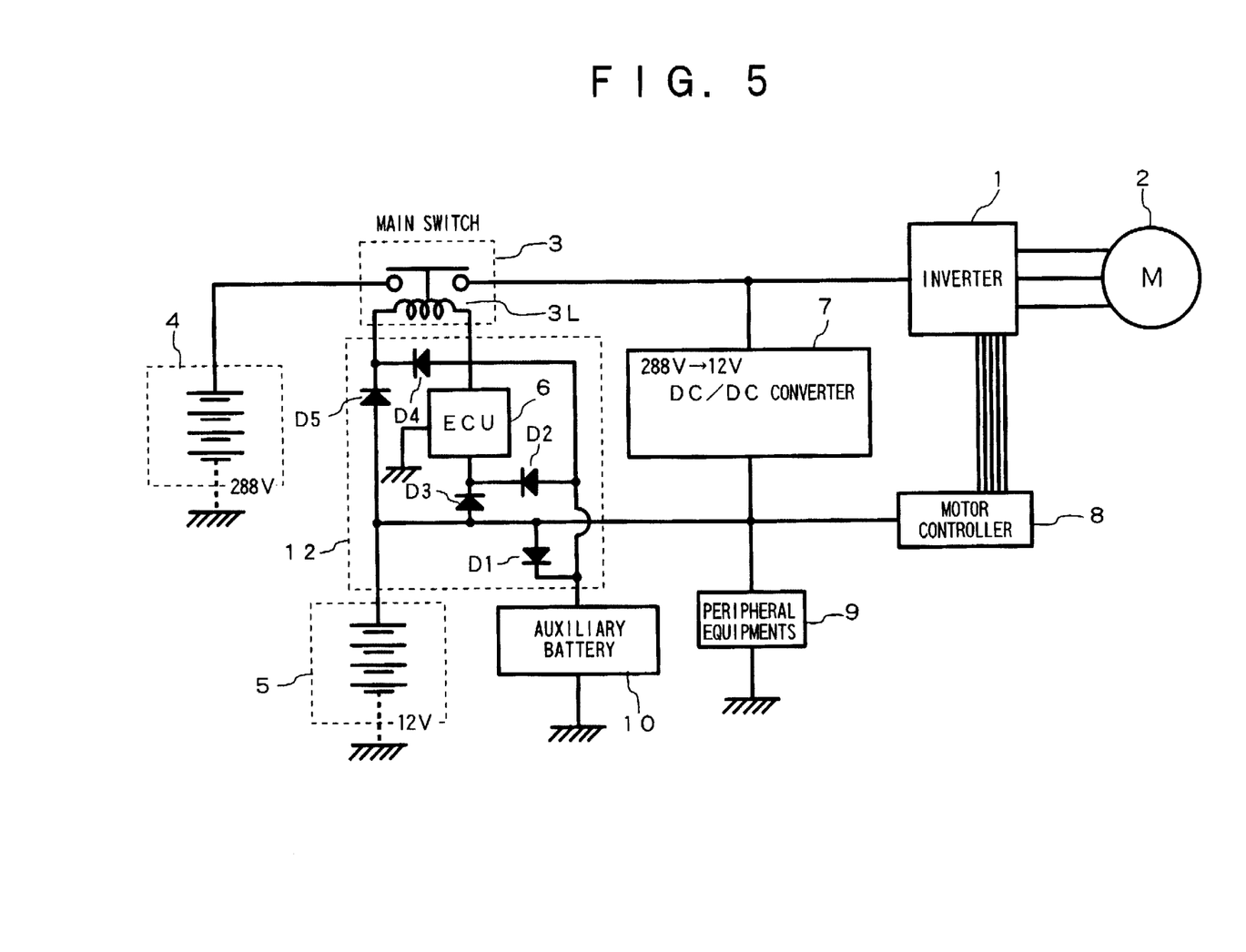
FIG. 5 is a block diagram of a power supply circuit for an electric vehicle showing a third embodiment of the present invention.

FIG. 5 is a block diagram of a power supply circuit for an electric vehicle showing a third embodiment of the present invention, in which like components are denoted by like numerals as of the previous embodiments. In the a third embodiment, a subcharge storage means 10 such as a secondary cell or a supercapacitor having a large storage capacity is connected to the output port of the DC/DC converter 7 in parallel with the low-voltage battery 5. The output of the subcharge storage means 10 is supplied as a backup power to the ECU 6 and the relay 3L of the main switch 3. There are provided diodes D1 to D5 to form a power supply line from the subcharge storage means 10 to the ECU 6 and the relay 3L which line is different from the charging line from the DC/DC converter 7 to the auxiliary battery 10, so that the auxiliary battery 10 is charged by the DC/DC converter 7, while its output or discharge current is supplied only to the ECU 6 and the energizing coil 3L.

According to the third embodiment, the ECU 6 and the relay 3L are energized by the subcharge storage means 10 regardless of the power consumption in the peripheral equipments 9 when the power supply from the low-voltage battery 5 and the DC/DC converter 7 is insufficient. The main switch 3 is thus maintained in its close state to eliminate the need of an unnecessarily high dielectric strength for the DC/DC converter 7 and the main switch 3. Also, the third embodiment contributes to the minimum dimensions and cost of the entire construction and will provide a safety condition for maintenance service.

Although only the ECU 6 and the relay or energizing coil 3L are energized by any of the sub power source 75, the sub step-down transformer 61, and the subcharge storage means 10 in the above embodiments, the motor controller 8 may also be powered by the same. It is also feasible that the voltage output of the low-voltage battery 5 is continuously monitored and if it is declined below a predetermined level (e.g. 7 V), the power supply to the ECU 6 is disconnected while the power supply is continued only to the energizing coil 3L. In this case, the sub power source 76, the sub step-down transformer 61, and the subcharge storage means 10 are set low in the capability and/or capacity, thus contributing to the downsizing, light weight, and less production cost of the power supply control device.

The advantages of the present invention are following:

(1) Even when the power supply from the low-voltage battery and the DC/DC converter is insufficient, the control section for controlling the opening and closing operations of the main switch is energized with an enough level of power supply. This allows the high-voltage battery to serve as a regulator for any counter-electromotive force generated in the motor by the regenerative braking.

(2) The backup power sources are free from a rush current introduced when the main switch is on, and do not require large capacities to contribute to the minimum dimensions and cost of the power supply control device.

(3) Upon the main switch receiving normally an open command, its contacts are dedicatedly opened even when the backup power source serves as a backup supply, thus providing a safety condition for maintenance service.

What is claimed is:

1. A power supply control device for an electric vehicle, comprising:
   - a voltage converter means connected through a main switch to a high-voltage battery;
   - a drive motor energized by the high-voltage battery;
   - a low-voltage battery and vehicle periphery equipment both connected to the voltage converter means for receiving a power supply;
   - a switch controlling means, connected to at least one of the voltage converter means and the low-voltage battery, for receiving a power supply and for controlling the opening and closing actions of the main switch; and
   - a means for supplementally supplying a backup power to the switch controlling means so that the switch controlling means is energized with enough power to ensure a normal operation of the switch controlling means,
   - wherein said switch controlling means receives a sum of voltage outputs of said voltage converter means, said low-voltage battery and said means for supplying said backup power.

2. A power supply control device according to claim 1, wherein the backup power is not supplied to the low-voltage battery and vehicle periphery equipment.

3. A power supply control device according to claim 1, wherein the voltage converter means comprises:
   - a voltage converter unit for converting the output voltage of the high-voltage battery to a drive voltage for vehicle periphery equipment;

a sub power source for converting the output voltage of the high-voltage battery to a voltage suitable for actuating the voltage converter unit, in which a part of the output of the sub power source is supplied as the backup power to the switch controlling means.

4. A power supply control device according to claim 3, further comprising a means for producing an alarm when the output of the sub power source exceeds a predetermined level.

5. A power supply control device according to claim 1, wherein the backup power supplying means is a sub voltage converter means for lowering and delivering the output of the high-voltage battery supplied through the main switch.

6. A power supply control device according to claim 1, wherein the backup power supplying means is a subcharge storage means connected in parallel to the low-voltage battery and charged with the output of the voltage converter means.

7. A power supply control device according to claim 6, further comprising a charging line extending from the voltage converter means to the backup power supplying means; and a power supply line extending from the backup power supplying means to the switch controlling means, the charging line being different from the power supply line.

8. A power supply control device according to claim 1, wherein the switch controlling means comprises:

a first supply line for transmitting the power from the voltage converter means and the low-voltage battery to a relay means of the main switch;

a second supply line for transmitting the backup power to the relay means of the main switch, and a controller unit for controlling the power supply along both the supply lines to the relay means.

9. A power supply control device according to claim 8, further comprising a third supply line for transmitting the backup power to the controller unit for ensuring the normal operation of the controller unit.

* * * * *